US008019673B1

(12) United States Patent
Rooney

(10) Patent No.: US 8,019,673 B1
(45) Date of Patent: Sep. 13, 2011

(54) IMPLIED MATRIX FOR TRADEABLE OBJECTS

(75) Inventor: Patrick J. Rooney, Saint Charles, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1028 days.

(21) Appl. No.: 11/768,503

(22) Filed: Jun. 26, 2007

(51) Int. Cl.
*G06Q 40/00* (2006.01)
(52) U.S. Cl. .......................... 705/37; 705/35
(58) Field of Classification Search .................. 705/35, 705/37
See application file for complete search history.

(56) References Cited

U.S. PATENT DOCUMENTS

| | | | |
|---|---|---|---|
| 6,772,132 B1 | 8/2004 | Kemp et al. | |
| 6,938,011 B1 | 8/2005 | Kemp et al. | |
| 7,127,424 B2 | 10/2006 | Kemp et al. | |
| 7,228,289 B2 | 6/2007 | Brumfield et al. | |
| 7,389,268 B1 | 6/2008 | Kemp et al. | |
| 2005/0192886 A1* | 9/2005 | Wender | 705/36 |

OTHER PUBLICATIONS

Unpublished U.S. Appl. No. 10/403,374, filed on Mar. 31, 2003, entitled "System and Method for Determining Implied Market Information".

* cited by examiner

*Primary Examiner* — Richard C Weisberger
(74) *Attorney, Agent, or Firm* — McDonnell Boehnen Hulbert & Berghoff LLP

(57) ABSTRACT

System and methods for displaying implied market data are developed. One example method includes displaying a plurality of indicators corresponding to a plurality of tradeable objects via a graphical interface. Upon identifying a first tradeable object, the method includes determining an implied relationship between the first tradeable object and the at least one of the plurality of tradeable objects. The method further includes displaying a graphical indicator in relation to an indicator corresponding to the first tradeable object and at least one indicator corresponding to the at least one of the plurality of tradeable objects to indicate an implied relationship between the first tradeable object and the at least one of the plurality of tradeable objects.

13 Claims, 4 Drawing Sheets

| T.O. | GEM8 | GEU8 | GEZ8 | GEH9 | GEM9 | GEU9 | GEZ9 | GEH0 | GEM0 |
|---|---|---|---|---|---|---|---|---|---|
| Last | 6909 | 6924 | 6944 | 6960 | 6981 | 6995 | 7001 | 7017 | 7040 |
| Ask | 6909 250 | 6931 100 | 6950 100 | 6965 300 | 6990 85 | 6995 1000 | 7010 55 | 7017 200 | 7051 200 |
| Bid | 6900 600 | 6922 85 | 6944 450 | 6960 120 | 6989 100 | 6990 200 | 7001 100 | 7020 7020 70 | 7040 100 |
| | | | | | | | | | |
| Ask | -87 | -60 | -41 250 | -30 1200 | 0 600 | | -7 300 | -23 600 | -46 200 |
| Bid | -90 | -65 | -50 300 | -32 550 | -1 100 | | -15 100 | -25 200 | -60 300 |
| Ask | -60 5 | -42 600 | -23 500 | -24 100 | | | | -8 50 | -31 250 |
| Bid | -70 96 | -55 300 | -36 420 | -19 1000 | | | | -23 25 | -49 70 |
| Ask | -55 46 | -30 100 | -11 220 | | | | | | -16 550 |
| Bid | -63 66 | -42 200 | -20 900 | | | | | | -32 200 |
| Ask | -35 2 | -14 500 | | | | | | | |
| Bid | -50 200 | -27 288 | | | | | | | |
| Ask | -14 150 | | | | | | | | |
| Bid | -30 85 | | | | | | | | |

200

212 214 216 218 220 222

GEU8  GEZ8  GEH9  GEM9  GEU9

228 GEM9
  5  300
  0  100

236 GEM9-GEU9-GEZ9

232 GEH9
  -18 50
   2  25

238 GEH9-GEM9-GEU9

FIG. 2

|     | GE H7 402 | GE M7 404 | GE U7 406 | GE Z7 408 |
|-----|---------|---------|---------|---------|
| O   | 9464.25 | 9469.0  | 9482.5  | 9497.5  |
| H   | 9464.25 | 9470.5  | 9483.0  | 9499.0  |
| L   | 9463.75 | 9466.0  | 9476.5  | 9490.6  |
| L   | 9463.75 | 9467.5  | 9478.0  | 9493.0  |
| Δ   | 2.0     | -1.5    | -4.0    | 4.0     |
| $   | -8300.0 | 1950    | -500    |         |
| P   | 166     | -52     | 5       | 0       |
| AP  | 9464.0  | 9468.0  | 9479.0  | 9494.0  |
| BP  | 9483.75 | 9467.5  | 9478.0  | 9493.0  |
|     | GE H7-M7 410 | GE H7-U7 412 | GE H7-Z7 414 | GE H7-H8 416 |
| O   | -4.75   | -18.50  | -32.75  | -45.75  |
| H   | -2.50   | -13.0   | -27.50  | -38.00  |
| L   | -8.00   | -19.25  | -30.75  | -45.75  |
| L   | -3.25   | -14.50  | -28.75  | -41.00  |
| Δ   | 1.75    | 3.50    | 5.0     | 3.5     |
| $   |         |         |         |         |
| P   | 0       | 0       | 0       | 0       |
| AP  | -3.00   | -14.00  | -29.00  | -40.0   |
| BP  | -3.25   | -14.50  | -30.25  | -41.0   |
|     | GE M7-Z7 418 | GE M7-H8 420 | GE M7-M8 422 | GE M7-U8 424 |
| O   | -28.50  | -39.50  | -46.00  | -48.50  |
| H   | -24.50  | -36.50  | -42.50  | -48.00  |
| L   | -29.00  | -40.50  | -46.00  | -48.50  |
| L   | -25.50  | -37.50  | -44.00  | -48.50  |
| Δ   | 2.50    | 2.00    | 1.5     | 1.50    |
| $   |         |         |         |         |
| P   | 0       | 0       | 0       | 0       |
| AP  | -29.00  | -37.00  | -43.00  | -48.00  |
| BP  | -29.50  | -37.50  | -44.00  | -48.50  |

FIG. 4

IMPLIED MATRIX FOR TRADEABLE OBJECTS

TECHNICAL FIELD

The present invention is directed towards electronic trading. More specifically, the present invention is directed to tools for displaying implied market information for tradeable objects.

BACKGROUND

Electronic trading is generally based on a host exchange, one or more computer networks, and client devices. Subscribing traders are connected to an exchange's electronic trading platform by way of communication links to facilitate real-time electronic messaging between themselves and the exchanges. The electronic trading platform includes at least one electronic market, which is at the center of the trading system and handles the matching of bids and offers placed by the traders for that market. The electronic messaging includes market information that is distributed from the electronic market to the traders via an electronic data feed. Once the traders receive the market information, it may be displayed to them on their trading screens. Upon viewing the information, traders can take certain actions including the actions of sending buy or sell orders to the electronic market, adjusting existing orders, deleting orders, or otherwise managing orders. Traders may also use software tools on their client devices to automate these and additional actions.

In addition to trading individual tradeable objects, many traders often implement trading strategies that involve simultaneous trading of two or more tradeable objects. One such trading strategy is commonly referred to as spread trading. In general, spread trading is the buying and/or selling of one, two, or more tradeable objects, one purpose of which is to capitalize on changes or movements in the relationships between the tradeable objects. The tradeable objects that are used to complete a spread are referred to as the outright markets or legs of the spread. A spread trade involves buying tradeable objects, buying and selling tradeable objects, selling tradeable objects or some combination thereof.

As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

Whether or not a trader decides to trade one or more tradeable objects, the trader wants to see as many buy and/or sell orders as possible for each particular market. For example, when trading in a particular market, it is useful to see every direct order (e.g., the order's quantity and price) that is in the market, but it is also useful to see every order that has been implied into the market. An implied order is made up of an implied price and its implied quantity. Implied prices and quantities are derived from direct orders in a combination of outright markets, spreads, or other trading strategies. For example, orders in outright markets may imply orders (referred to as an 'implied in' orders) into a spread market, and orders in a spread market plus orders in an outright market may imply orders (referred to as an 'implied out' orders) into another outright market.

There are different generations of implied pricing. Generations indicate how far removed an implied price/quantity is from a direct price. For example, a first generation implied price is generated from two direct prices, and a second generation implied price is generated using the first generation implied price. Additional generations of implied pricing are determined using the same method.

Most existing matching engines consider implied orders when checking for matches, and some exchanges transmit one or more generations of implied prices and quantities. Because many exchanges match more implied prices than they provide and some exchanges don't even provide implied data, systems and methods have been developed to calculate implied prices and quantities for tradeable objects, and provide the calculated implied data to client terminals to allow traders make better trading decisions based on the more accurate market data. One such system is described in the patent application Ser. No. 10/403,374 filed on Mar. 31, 2003, entitled "A System and Method for Determining Implied Market Information," the contents of which are fully incorporated herein by reference.

Regardless of how implied prices and quantities are computed, traders wish to view the accurate market conditions so that they can get the best prices for their trades. It is therefore desirable to offer tools that can assist a trader in an electronic trading environment, and help the trader make trades at the most favorable prices in a speedy and accurate manner.

SUMMARY

According to example embodiments described herein, methods are provided for displaying implied market data relationship between tradeable objects being traded in an electronic trading environment. One example method includes displaying a plurality of indicators corresponding to a plurality of tradeable objects being traded on at least one electronic exchange, and identifying a first tradeable object from the plurality of tradeable object. Upon identifying the first tradeable object, such as upon a user selecting the first tradeable object, the method further includes determining an implied relationship between the first tradeable object and at least one of the plurality of tradeable objects. Once the implied relationship(s) are determined, a graphical implied-relationship indicator is displayed in relation to an indicator corresponding to the first tradeable object and at least one indicator associated with one or more of the plurality of tradeable objects for which the implied relationships have been determined. The graphical implied-relationship indicator is used to indicate the implied relationships between the first tradeable object and other tradeable objects. The implied relationship may be an implied-in or implied-out relationship. Different implied data indicators can be displayed as well, as will be described later.

To illustrate the present invention and aspects thereof, the following description, including the figures and detailed description, provides examples that can be used or readily modified by one of ordinary skill to generate a system or method that benefits from the teachings described and claimed herein. Other features of the present invention will become more apparent to persons having ordinary skill in the art to which the present invention pertains from the following description and claims.

BRIEF DESCRIPTION OF THE DRAWINGS

Example embodiments are described herein with reference to the following drawings, in which:

FIG. 2 is a block diagram illustrating an example interface for displaying implied market data that enables a user to view the flow of implied prices;

FIG. 4 is a block diagram illustrating another example embodiment for mapping implied associations between a plurality of tradeable objects and trading strategies.

DETAILED DESCRIPTION

The present invention is related to displaying implied market data for tradeable objects. The present invention is applied in an electronic trading network environment, but could be also applied in other network environments as well. A trading network environment is one that distributes time sensitive data to receiving computers, such as price data. To illustrate aspects of the present invention, interfaces are illustrated in example form using the drawings referred to herein. One of ordinary skill in the art will recognize, however, that such examples may be quickly and readily adaptable using the teachings described herein. Aspects of the present invention are protected by the accompanying claims. Limitations from the patent specification should not be improperly incorporated into the claims unless explicitly stated or otherwise inherently known.

I. Example Trading System Configuration

Figure 1:
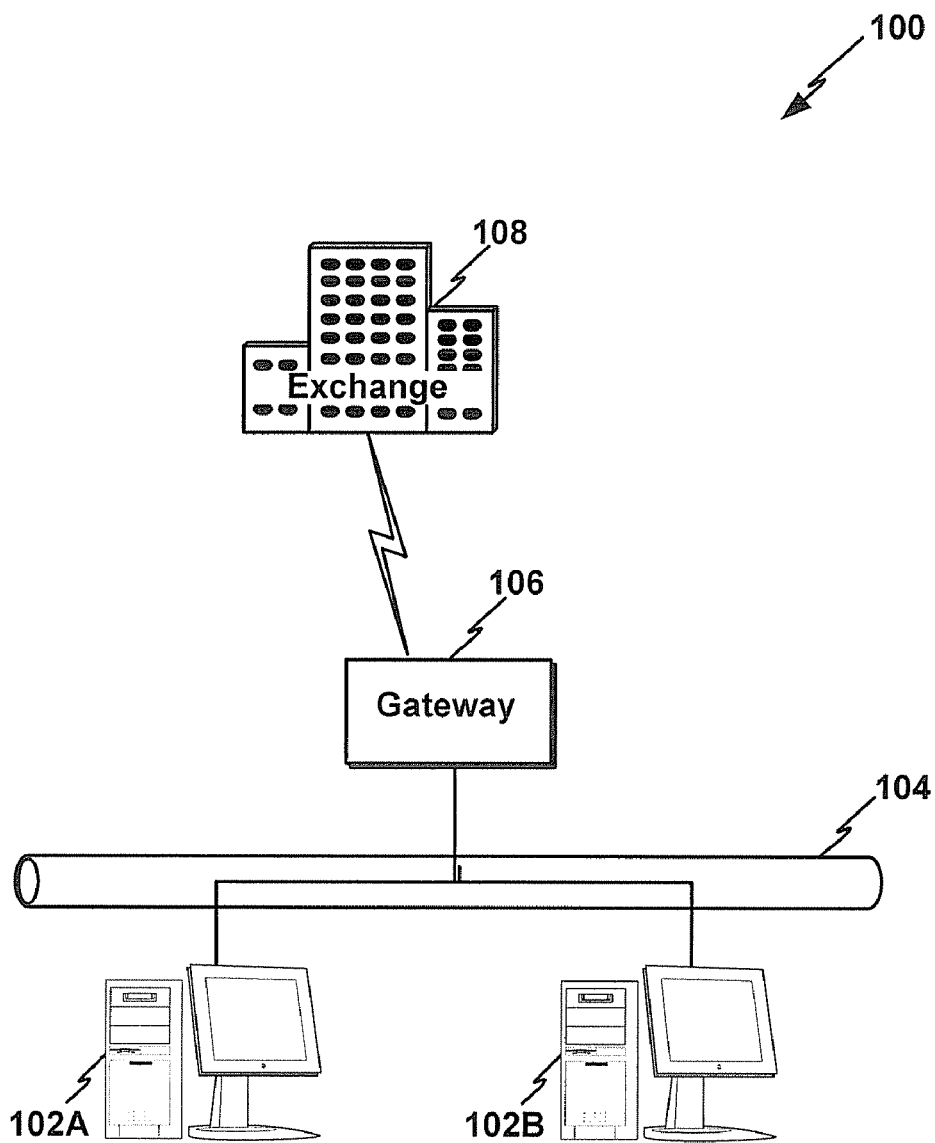
FIG. 1 is a block diagram illustrating an example electronic trading system in which a client terminal and a gateway device are on a local area network.

FIG. 1 illustrates an example electronic trading system 100 in which the example embodiments may be employed. The example system 100 comprises trading stations 102A and 102B that access an electronic exchange 108 through a gateway 106. As illustrated in FIG. 1, the trading stations 102A-B and the gateway 106 are located within a local LAN 104, although other configurations are possible, such as the trading stations 102A-B communicating with the gateway 106 through a remote host in a remote network configuration environment. While not shown, a router could be used to route messages between the gateway 106 and the electronic exchange 108. The electronic exchange 108 includes a computer process (e.g., the central computer) that matches buy and sell orders sent from the trading stations 102A-B with orders from other trading stations (not shown). The electronic exchange 108 may list one or more tradeable objects for trading. While not shown in FIG. 1 for the sake of clarity, the trading system may include other devices that are specific to the client site like middleware and security measures like firewalls, hubs, security managers, and so on, as understood by persons skilled in the art.

Regardless of the types of order execution algorithms used, the electronic exchange 108 provides market information to the subscribing trading stations 102A-B. Market information includes price data for one or more tradeable objects. Price data might include the inside market, which is the best bid and the best ask price currently available for a tradeable object, the last traded price, and other prices for which there is quantity pending in the market. Price data may include other items of interest, or include only certain pieces of information. Also, price data may include direct price data along with implied price data. While the example embodiments are described herein as distributing price data, other types of information can be distributed in an electronic trading environment. In the embodiment where the electronic exchange 108 calculates implied market data, the exchange 108 may provide the calculated implied prices and quantities to the subscribing trading stations 102A-B.

The computer employed as the trading stations 102A-B generally can range from a hand-held device, laptop, or personal computer to a larger computer such as a workstation and multiprocessor. An illustrative personal computer may use Pentium™ microprocessors and may operate under a Windows operating system, or yet may use some other microprocessor or operating system. Generally, the trading stations 102A-B includes a monitor (or any other output device) and an input device, such as a keyboard and/or a two or three-button mouse to support click based trading, if so desired. One skilled in the art of computer systems will understand that the present example embodiments are not limited to any particular class or model of computer employed for the trading stations 102A-B and will be able to select an appropriate system.

In one example embodiment, the trading stations 102A-B use software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a trading station could run automated types of trading applications.

The example embodiment may be implemented in relation to any type of trading screen, therefore, details regarding the trading screen are not necessary to understand the present invention. However, in one embodiment, one type of trading screen that can be used is provided by a commercially available trading application referred to as X_TRADER@ from Trading Technologies International, Inc. of Chicago, Ill. X_TRADER@ also provides an electronic trading interface, referred to as MD Trader™, in which working orders and/or bid and ask quantities are displayed in association with a static price axis or scale.

Portions of the X_TRADER® and the MD Trader™-style display are described in U.S. Pat. No. 6,772,132, entitled "Click Based Trading With Intuitive Grid Display of Market Depth," filed on Jun. 9, 2000, U.S. Pat. No. 6,938,011, entitled "Click Based Trading with Market Depth Display" filed on Jun. 9, 2000, U.S. Pat. No. 7,127,424 entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference. However, it should be understood that orders in the system illustrated in FIG. 1 could also be placed using any other trading application as well. Additionally, the preferred embodiments are not limited to any particular product that performs translation, storage, and display function.

The computer employed as the gateway 106 generally can range from a personal computer to a larger or faster computer. An illustrative gateway computer may use Pentium™ microprocessors and may operate under a Windows (server or workstation) operating system, or yet some other system. Generally, the gateway 106 additionally includes a monitor (or any other output device), input device, and access to a database, if so desired. One skilled in the art of computer systems will also understand that the present example embodiments are not limited to any particular class or model of computer(s) employed for the gateway 106 and will be able to select an appropriate system. Additionally, in some instances, a gateway, such as gateway 106, may not even be necessary and/or another type of network intermediary device may be employed. As mentioned earlier, either the gateway 106 or the client terminals 102 may include applications for computing implied prices based on market data provided by the exchange 108.

It should be noted that computer systems that are employed here as a trading station or a gateway generally includes a central processing unit, a memory (a primary and/or secondary memory unit), an input interface for receiving data from a communication network, an input interface for receiving input signals from one or more input devices (for example, a keyboard, mouse, etc.), and an output interface for communications with an output device (for example, a monitor). A system bus or an equivalent system may provide communications between these various elements.

Memory on either the gateway 106 or the trading station 102 includes a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, any other physical medium, memory chip or cartridge, or any other medium from which a computer can read.

It should also be noted that the trading stations 102A-B generally execute application programs resident at the trading stations 102A-B under the control of the operating system of the trading station. Also, the gateway 106 executes application programs resident at the gateway 106 under the control of the operating system of the gateway 106. In other embodiments and as understood by a person skilled in the art, the function of the application programs at the trading stations 102A-B may be performed by the gateway 106, and likewise, the function of the application programs at the gateway 106 may be performed by the trading stations 102A-B.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example, the gateway device may be located at the client site along with the trading station, which is usually remote from the matching process at the electronic exchange. According to another example, the gateway device may be located at the exchange side. As such, the present invention is not limited to any actual network configuration.

According to the illustrated embodiment, the trading stations 102A-B, the gateway 106, and any routers communicate over the LAN 104, and the gateway 106 may communicate with the matching process at the electronic exchange 108 over a T1, T3, ISDN, or some other high speed connection. In another example illustration, the client site may be located on the actual grounds of the electronic exchange (for example, in the building of the exchange). According to this instance, the trading station and the gateway may still communicate over a LAN, but if any routers are used, they may communicate with the matching process at the electronic exchange through another connection means besides a T1, T3, or ISDN. In yet another example illustration, the gateway may be housed at, or near, its corresponding electronic exchange. According to this instance, the trading station may communicate with the gateway over a wide area network or through the use of a T1, T3, ISDN, or some other high speed connection.

While a single exchange is shown in FIG. 1, it is understood that a trader may obtain access and trade at multiple electronic exchanges. In such an embodiment, a client terminal could access multiple exchanges through multiple gateways, with each gateway designated for a specific exchange. Alternatively, a single gateway may be programmed to handle more than one electronic exchange.

It could be very valuable to provide a trader with the opportunity to trade tradeable objects listed at different electronic exchanges. For example, a trader could view market information from each tradeable object through one common visual display. As such, price and quantity information from the two separate exchanges may be presented together so that the trader can view both markets simultaneously in the same window. In another example, a trader can spread-trade different tradeable objects listed at the different electronic exchanges. Regardless, the present invention is not so limited.

II. Example Interface Configuration

The example interfaces described below allow a user to view implied market data and relationships between the tradeable objects, spreads, or other trading strategies that are used to imply market data.

As explained earlier, implied prices and quantities are derived from direct orders in a combination of outright tradeable objects and spreads or other trading strategies. Implied pricing has evolved at exchanges that trade different months of tradeable objects as well as spreads and strategies involving different combinations of contract months. For example, a bid in one month of a tradeable object and an offer in a second month of the same or different tradeable object may be combined to 'imply' a bid in a spread between the two months. By calculating and providing implied prices and quantities, the best bid/ask prices as well as market liquidity may often be improved for certain tradeable objects or strategies.

There are three major types of implied pricing: implied in, implied out, and implieds from implieds. An implied in, such as implied spread data, is determined by combining two outright legs to imply the spread between the legs. For example, with two outright legs 'A' and 'B,' an implied bid price for a spread AB may be calculated as follows: (Bid Price Leg A)−(Ask Price Leg B). Then, an implied ask price for the spread AB may be calculated as follows: (Ask Price Leg A)−(Bid Price Leg B). An implied out occurs when direct prices of one leg and the spread between the legs are used to imply a price in a second leg of the spread. For example, an implied ask price for leg 'A' may be calculated as follows: (Ask price Spread AB)+(Ask price of leg B). Then, implieds from implieds occur when an implied price/quantity is used to imply another price/quantity.

FIG. 2 is a block diagram illustrating an example interface 200 for displaying implied market data that enables a user to view the flow of implied prices. The interface 200 will be described in relation to outright markets and spreads; however, it should be understood that the example interface 200 could be used to display relationships between different trading strategies as well. Also, while the interface 200 displays implied data for two- and three-legged spreads, it should be understood that implied data for different types of spreads could be displayed as well, as will be shown in the examples provided below.

The interface 200 includes a number of rows and columns. The first row includes a number of sub-rows. The first sub-row 202 indicates tradeable objects by displaying identifiers for the tradeable objects. It should be understood that a user may select the tradeable objects traded at an exchange. A tradeable object selected by a user may have associated with it a time period and a strike price, one or both of which may be used in computing and displaying spreads from the selected tradeable objects. It should be understood that various time periods, such as days, weeks, months, years or others, can be used as well.

FIG. 2 displays identifiers and market data corresponding to nine tradeable objects; however, it should be understood that the interface 200 could be used to display a fewer or greater number of tradeable objects, and it could also display identifiers corresponding to trading strategies. As shown in FIG. 2, the tradeable object row 202 includes GEM8, GEU8, GEZ8 that correspond to GE June 08, GE Sep 08, and GE Dec 08. Then, the next four identifiers GEH9, GEM9, GEU9, and GEZ9 correspond to GE March 09, GE June 09, GE Sep 09, and GE Dec 09. The next two identifiers correspond to GE March 10 and GE June 10. As shown in FIG. 2, the interface 200 may continue to the right of the data displayed for GEM0. It should be understood that the identifiers corresponding to the tradeable objects could be color-coded based on the expiration dates of the tradeable object.

The next three sub-rows display implied market data for each tradeable object. The sub-rows include a last traded price "Last" row 204, the best offer and quantity "Ask" row 206, and the best bid and quantity "Bid" row 208. For example, referring to the first tradeable object GEM8, the last traded price is '6909,' the best ask quantity of '250' is at the best ask price of '6909,' and the best bid quantity of '600' is at the best bid price of '6900'. The same set of data is displayed for other tradeable objects displayed via the interface 200.

The second row 210 is a calendar column that displays two-leg spread information for the combination of tradeable objects. The row 210 includes two sub-rows that display ask/bid prices and quantities for various spreads. As shown on the left side of the row 210, there are five spreads 212-220 computed for the combination of six months. The interface 200 displays price and quantity information for each spread under the column corresponding to the tradeable object corresponding to one leg of the spread. Then, the second leg of the spread corresponds to the tradeable object for which no spread data is specified in the row. Referring to the second row 210, all five spreads 212-220 share a common spread leg corresponding to the GEU9, as indicated to the right of the spread cell 220. Thus, for example, the first spread cell 212 displays price and quantity information corresponding to GEM8/GEU9 spread, then the second spread cell 214 displays information for GEU8/GEU9 spread, etc. The vertical display of the spread information that can be easily correlated to the months of the spread allows a trader to easily view the outright information for the months as well as the spreads corresponding to the respective months.

Referring now to the next row 224, additional spread data is displayed with the common spread leg being "GEM9," as shown at 228. The spread cells illustrated in the row 224 correspond to spreads "GEM8/GEM9," "GEU8/GEM9," "GEZ8/GEM9," and "GEH9/GEM9." Then, the next row 230 shows three spread cells, with the tradeable object "GEH9" being the common leg, the next row 232 shows two spreads with the leg "GEZ8" being the common leg, and the last row 234 shows a spread between "GEM8" and "GEU8." Similar configuration layout and mappings are applied to the tradeable objects as well as spreads displayed to the right of "GEU9."

In addition to displaying two-leg spreads, the screen may also display multi-leg spreads, such as butterflies or condors. A butterfly refers to a three-leg spread, and a candor generally refers to a four-leg spread. It should be understood, however, that the examples are not limited to butterflies and condors, and may be extended to any multi-leg spread. Buying a butterfly includes buying one first month, selling twice as many contracts of the second month, and buying one third month. Selling a butterfly includes selling one first month, buying twice as many contracts of the second month and selling one contract of the third month. In the butterfly, the two contracts of the second month are the same, so the butterfly is a three-leg spread. The interface 200 illustrates two butterfly spreads 236 and 238, with the first spread 236 including tradeable objects GEM9-GEU8-GEZ9, and the second spread 238 including GEH9-GEM9-GEU9. While only two butterfly spreads are shown, it should be understood that additional spreads could also be displayed.

Also, the example embodiments are not limited to displaying three-leg spreads, and different spread types such as condors could be illustrated as well. Buying a condor is commonly executed as buying one front month, selling two middle months, and buying one far month. Selling a condor is executed as selling one front month, buying two middle months, and selling one far month. In contrast to the butterfly, the two middle months in the candor are not the same. Thus, the condor is a four-leg spread. While butterflies and condors can be formed from outright tradeable objects, they can alternatively be formed from a combination of two different two-leg spreads.

As mentioned earlier, the interface 200 displays implied in and implied out market data for the selected tradeable objects. The interface 200 also allows a user to view mappings where implied prices originate from or where implied prices imply out to. According to one example embodiment, a user may select a desired tradeable object via the interface 200 and enter a predetermined input to view indicators that map where implied prices and quantities for the tradeable object originate from or where the prices and quantities imply out to. Alternatively, the interface 200 may display the implied relationships automatically.

It should be understood that many different indicators could be used to show the relationship between implied data of tradeable objects and strategies, such as spreads illustrated in relation to the interface 200. According to one example embodiments illustrated in FIG. 2, arrows are used to show where the implied prices and quantities imply into and out to. For example, there are two arrows that are pointing at the implied bid price and quantity in 'GEM9' cell. The two arrows originate in the cells of the prices corresponding to 'GEU9' tradeable object and 'GEM9-GEU9' spread that are used to generate implied out bid data for 'GEM9.' FIG. 2 also illustrates an arrow pointing from the implied bid data corresponding to 'GEM9' tradeable object, because it is used along with the ask data of 'GEH9,' to determine implied in ask data in the spread 'GEH9-GEM9.'

According to one example embodiment, arrows or some other indicators may be activated by default. Alternatively, a user may configure the interface 200 to show implied indicators when a specific price/quantity is selected. For example, when a user selects a tradeable object or a trading strategy displayed via the interface 200, arrows may be displayed to map where the selected price implies out to or where the implied price originates from. If the price/quantity data corresponds to direct data, a direct price indicator or yet no indicator could be displayed.

In addition to showing where prices are implied from or imply out, the interface 200 may also illustrate different generations of implied pricing. As explained earlier, generations indicate how far removed an implied price is from a direct price. For example, a first generation implied price is generated from two direct prices, and a second generation implied price is generated using at least one first generation implied price. According to one example embodiment, different generations of implied prices may be identified using graphical indicators. For example, shading or different colors could be used to distinguish different generations, such as for example, yellow could be used for the first generation implied prices while the second generation implied prices could be shaded green. Different colors could be used as well. In the embodiment illustrated in FIG. 2, the implied bid data of 'GEM9' could be shaded yellow, because it is a first generation implied price. Then, because the implied bid price of 'GEM9' implies out to the ask price in the 'GEH9-GEM9' spread, the implied ask price of the spread is a second generation implied price and could be shaded green. It should be understood that different indicators could also be used to illustrate generations of implied prices.

While the interface 200 displays implied prices for each tradeable object, it should be understood that a combination of implied and direct prices and quantities could be displayed as well to give a user a better overview of market conditions. If a combination of implied and direct quantities are displayed using a single value, the displayed quantity value or a cell that displays the combined data could be color-coded to indicate the amount of implied quantities. For example, assuming that there is a quantity of '100' pending at a price for a tradeable object, and the quantity of '100' is all direct, no indicators would be provided. Then, assuming that '25' of '100' is implied, an indicator could be provided to indicate a percentage of the implied quantity. For example, a cell displaying the quantity value could be shaded yellow. Then, if a quantity of '50' of '100' is implied, the cell could be shaded orange. It should be understood that different indicators could also be used to represent percentages of an implied quantity.

It should be understood that as the market data corresponding to each tradeable object changes, the implied data may be dynamically recalculated and displayed via the interface 200. As mentioned earlier, the implied data can be provided by an exchange or calculated at some other network entity, or the combination of implied data from different sources could be used as well. According to one example embodiment, the interface 200 may allow a user to quickly view the effect that a change in a price/quantity may have on prices/quantities of other tradeable objects. For example, color-coding could be used to alert a user of specific changes that the user wishes to view. In one embodiment, if a price improves, a cell corresponding to a tradeable object having the improved price may turn a predefined color, such as blue. Then, if a price gets worse, a different color could be used to alert a user of the change. Different graphical or audio alerts could be used as well.

Additionally, the interface 200 could be configured to allow a user to change any of the displayed bid/ask prices and/or corresponding quantities and to view how the change affects prices and quantities of other tradeable objects. It should be understood that the interface could be programmed to display the effects of the change for a predetermined time period, and at the end of time period, the interface 200 could once again display the current data. Alternatively, a user can initiate the switch to the current data.

Figure 3:
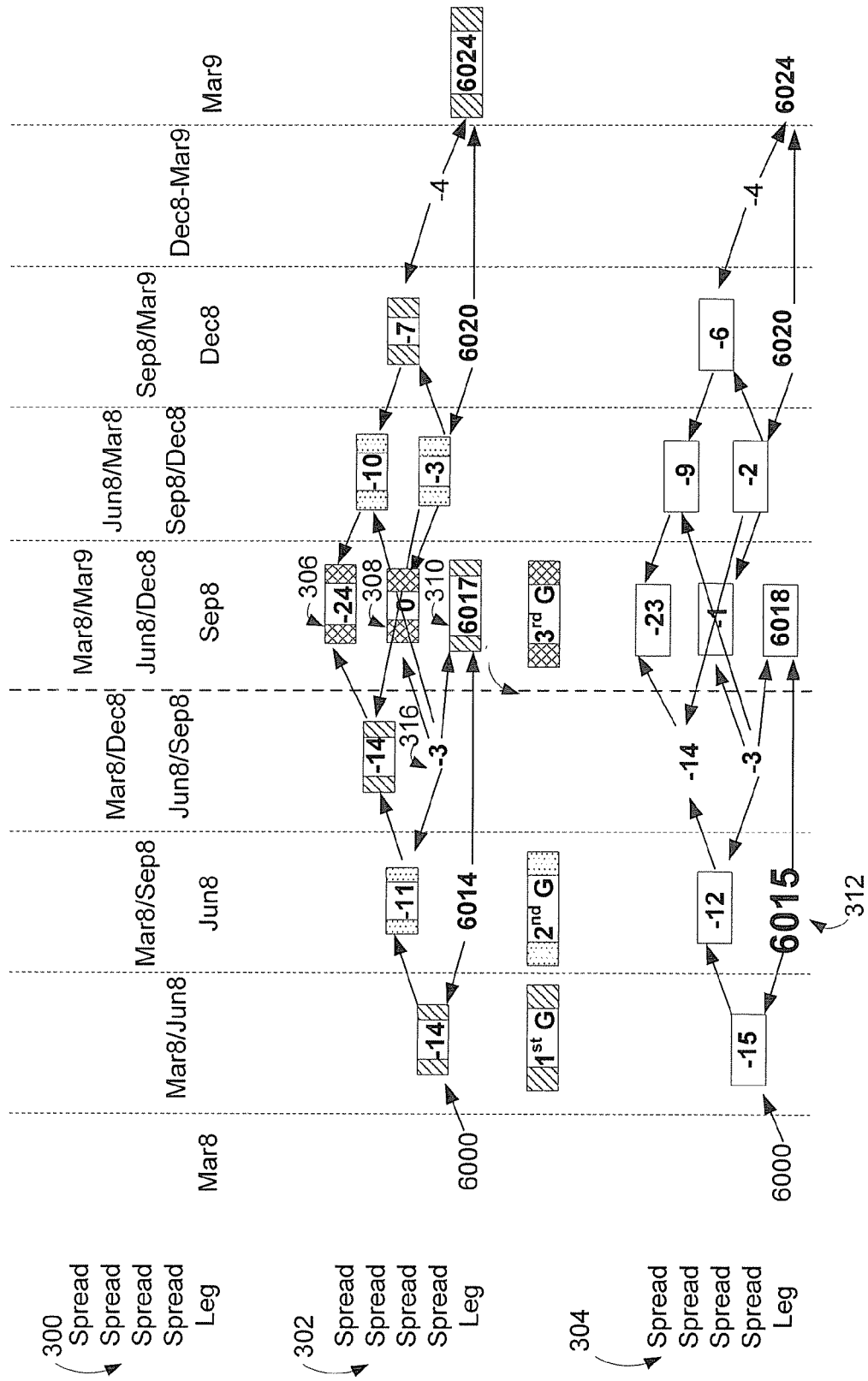
FIG. 3 illustrates diagrams that enable a user to view how a change in a price corresponding to one tradeable object affects prices of other tradeable objects and trading strategies.

FIG. 3 illustrates diagrams that enable a user to view how a change in a price corresponding to one tradeable object affects prices of other tradeable objects and trading strategies. As mentioned earlier, the change may occur due to a change in market data or due to an input received from a user.

Referring to the top portion 300 of the diagram, identifiers corresponding to different tradeable objects and trading strategies are arranged in a column format. Market data illustrated in each respective column below corresponds to each tradeable object or spread associated with each column. For example, referring to the middle portion 302, implied prices displayed in the fifth column correspond to Mar08-Mar09 spread, Jun09-Dec08 spread, and Sep08, as shown at 306, 308, and 310.

The diagram 302 also provides indicators that map where prices imply out to and where the prices imply into, as shown using arrows. Additionally, different generations of prices are distinguished using graphical indicators. According to one example embodiment, no indicator is used in relation to direct prices, the first generation implied prices are displayed using a first shading type, the second generation implied prices are displayed using a second shading type, and the third generation implied prices are displayed using a third shading type. It should be understood that color-coding could be used as well, with different colors indicating the generation levels of implied prices. For example, yellow, green, and blue could be used in relation to the first, second, and third generations of implied prices, respectively. Additionally, the example embodiments are not limited to showing the first, second, and third generations of implied data, and additional generations, up to the 'n-th' generation could be shown as well, depending on the system configuration or user's preferences.

Now, referring to the bottom of FIG. 3, the diagram 304 illustrates the effect of changing one price in a heavily implied market. The price in Jun08 has changed from '6014' to '6015,' as shown at 312. As shown in FIG. 3 in relation to prices shown in rectangular boxes, the change in one price has changed implied prices of eight other tradeable objects/spreads. More specifically, the change in price of Jun08 has changed the prices of 'Mar08/Jun08,' 'Mar08/Sep08,' 'Mar08/Mar09,' 'Jun08/Dec08,' 'Sep08,' 'Jun08/Mar08,' 'Sep08/Dec08,' and 'Sep08/Mar09.' As explained earlier, the price change may occur due to a market change or can be initiated by a user who wishes to see the effects of a user-entered price change in one or more tradeable objects or spreads on other tradeable objects/spreads.

While the examples above illustrated one embodiment for showing mappings between implied in and out prices, it should be understood that the mappings could be illustrated using many different methods and in relation to many different interfaces.

FIG. 4 is a block diagram 400 illustrating another example embodiment for mapping implied associations between a plurality of tradeable objects and trading strategies. More specifically, the block diagram 400 illustrates a quote board display that illustrates market data corresponding to a plurality of tradeable objects and spreads. The quote board 400 displays twelve panes 402-424 that illustrate market data corresponding to twelve tradeable objects and spreads. Each pane in the quote board 400 displays a plurality of fields, such as illustrated in relation to the first pane 402 corresponding to a tradeable object 'GE H7.' The fields include an opening price for a day field 'O,' a high price for a day field 'H,' a low price for a day 'L,' a last traded price 'L,' a net change on the day 'Δ,' a net position for a tradeable object '$,' and a profit/ loss level ("P/L") for a tradeable object calculated based on a last traded price 'P,' ask/bid price 'AP' and 'BP.' It should be understood that different or additional data could be displayed in relation to each pane. For example, each pane could display the most recent ask/bid quantity, current volume, as well as other data types.

According to one example embodiment, to view mappings of implied prices in relation to one or more tradeable objects, a user may select a specific tradeable object/spread via the quote board, such as by clicking on a pane corresponding to the desired tradeable object/spread and then the user may select a 'map implied prices' function. The 'map implied prices' function could be available via a pull down menu, or may be activated upon entering a predefined input, such as a selection of one or more keys on a keyboard that may activate the display impl. In the embodiment illustrated in FIG. 4, the pane 414 corresponding to a spread 'GE H7-Z7' is selected as a focal tradeable object. Upon the selection, the quote cell 414 may be color-coded to indicate whether prices corresponding to the spread are implied or direct. Additionally, the header of the pane 414 may be color-coded to indicate it is the focal tradeable object. Then, cells corresponding to other tradeable objects/spreads could be color-coded as well to indicate implied mappings based on the focus tradeable object/spread. While colors cannot be illustrated in FIG. 4, different shading will be used to illustrate the example embodiments. However, it should be understood that different embodiments for showing implied price mappings could be used as well, such as shading, color-coding, displaying graphical indicators in relation to each pane, or the combination thereof.

In the embodiment shown in FIG. 4, a first pattern is used in relation to the cell 414 to indicate that the quote for the 'GE H7-Z7' spread is a second generation implied. Then, a second pattern is used in relation to cells 402 and 408 to indicate that 'GE H7' and 'GE Z7' imply into the focal cell 414. A third pattern is used in relation to the cells 412 and 418 for 'GE H7-U7' and 'GE M7-Z7' to indicate they imply out of the focal cell 414. The cells with no implication in or out with the focal cell have no pattern.

Although the example programs, processes and methods have been described and illustrated in detail, it is clearly understood that the same is by way of illustration and example only and is not to be taken by way of limitation. Since numerous modifications and changes will readily occur to those skilled in the art, it is not desired to limit the invention to the exact construction and operation shown and described, and accordingly, all suitable modifications and equivalents may be resorted to, falling within the scope of the invention.

According to one embodiment, the example system takes the form of a computer program product that is stored on a computer readable storage medium and is executed by a suitable instruction execution system in the computer-based device. The term computer readable medium, as used herein, refers to any medium that participates in providing instructions to processor for execution. Such a medium may take many forms, including but not limited to, non-volatile media, volatile media, and transmission media. Nonvolatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

According to an alternative embodiment, a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method step described in the flow diagrams may be implemented in dedicated hardware such as an ASIC, or as program instructions carried out by a microprocessor or other computing device. It will be apparent to those of ordinary skill in the art that the methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for displaying implied market data relationships for tradeable objects being traded in an electronic trading environment, comprising:
    displaying first market data related to a first tradeable object at a first location on a user interface, wherein the first market data comprises at least one of a first price and a first quantity available for the first tradeable object at the first price;
    displaying second market data related to a second tradeable object at a second location on the user interface, wherein the second market data comprises at least one of a second price and a second quantity available for the second tradeable object at the second price;
    determining that at least one of the second price and the second quantity is implied based on at least one of the first price and the first quantity of the first tradeable object; and
    displaying a graphical indicator in relation to the first location and the second location on the user interface to indicate that the at least one of the second price and the second quantity is implied for the second tradeable object based on the at least one of the first price and the first quantity of the first tradeable object.

2. The method of claim 1, wherein displaying the first price comprises displaying at least one of a first highest bid price and a first lowest ask price for the first tradeable object, and wherein displaying the second price comprises displaying at least one of a second highest bid price and a second lowest ask price for the second tradeable object.

3. The method of claim 2, wherein displaying the first quantity comprises displaying a quantity available at any of the first highest bid price and the first lowest ask price, and wherein displaying the second quantity comprises displaying a quantity available at any of the second highest bid price and the second lowest ask price.

4. The method of claim 1, further comprising:
receiving a user selection to identify the first tradeable object, and responsively determining that the at least one of the second price and the second quantity is implied based on the at least one the first price and the first quantity.

5. The method of claim 1, wherein the first tradeable object comprises a spread.

6. The method of claim 1, wherein the graphical indicator is used to indicate an implied-out relationship between the first tradeable object and the second tradeable object.

7. The method of claim 1, wherein the graphical indicator is used to indicate an implied in relationship between the first tradeable object and the second tradeable object.

8. The method of claim 1, further comprising:
using a first graphical indicator type to indicate an implied-in relationship between the first tradeable object and the second tradeable object.

9. The method of claim 1, further comprising;
using a second graphical indicator type to indicate an implied-out relationship between the first tradeable object and the second tradeable object.

10. The method of claim 1, further comprising:
using a first graphical indicator type to indicate a first generation of implied prices, wherein the first generation of implied prices comprises an implied price generated using two direct prices; and
using a second graphical indicator type to indicate a second generation of implied prices, wherein the second generation of implied prices is generated using at least one first generation implied price.

11. The method of claim 1, further comprising:
using a second graphical indicator to indicate a what percentage of the second quantity is an implied quantity.

12. The method of claim 11, wherein the percentage is indicated by color-coding the second quantity.

13. The method of claim 1, wherein the second tradeable object comprises a spread.

* * * * *